US011905659B2

(12) United States Patent
Lindblom

(10) Patent No.: US 11,905,659 B2
(45) Date of Patent: Feb. 20, 2024

(54) REFINER SEGMENT HAVING BAR WEAKENING SECTIONS

(71) Applicant: VALMET AB, Sundsvall (SE)

(72) Inventor: Thommy Lindblom, Hägersten (SE)

(73) Assignee: VALMET AB, Sundsvall (SE)

( * ) Notice: Subject to any disclaimer, the term of this patent is extended or adjusted under 35 U.S.C. 154(b) by 623 days.

(21) Appl. No.: 17/046,439

(22) PCT Filed: Feb. 20, 2019

(86) PCT No.: PCT/SE2019/050153
§ 371 (c)(1),
(2) Date: Oct. 9, 2020

(87) PCT Pub. No.: WO2019/199215
PCT Pub. Date: Oct. 17, 2019

(65) Prior Publication Data
US 2021/0040689 A1 Feb. 11, 2021

(30) Foreign Application Priority Data
Apr. 13, 2018 (SE) .................................... 1850420-9

(51) Int. Cl.
*D21D 1/30* (2006.01)
*B02C 7/12* (2006.01)

(52) U.S. Cl.
CPC ............... *D21D 1/306* (2013.01); *B02C 7/12* (2013.01); *D21D 1/30* (2013.01); *D21D 1/303* (2013.01)

(58) Field of Classification Search
CPC . B02C 7/12; D21D 1/30; D21D 1/303; D21D 1/306
See application file for complete search history.

(56) References Cited

U.S. PATENT DOCUMENTS 4,953,796 A 9/1990 Virving
5,373,995 A 12/1994 Johansson
5,467,931 A 11/1995 Dodd
(Continued)

FOREIGN PATENT DOCUMENTS

WO WO-2008/098153 A1 8/2008

OTHER PUBLICATIONS

Extended European Search Report, Application No. 19785169.4, dated Dec. 6, 2021, 7 pages.
(Continued)

*Primary Examiner* — Faye Francis
(74) *Attorney, Agent, or Firm* — Foley & Lardner LLP

(57) ABSTRACT

A refiner segment for a refiner of lignocellulosic material includes a first bar, a second bar, a first dam, and a second dam. The first bar has a width and includes a first bar weakening section. The first bar weakening section includes two planar faces defining a wedge-shaped recess with a tip and a base. The two planar faces meet at the tip. The tip is separated from the base by a depth. The depth is greater than or equal to half of the width and less than or equal to the width. The first dam extends between the first bar and the second bar. The second dam extends between the first bar and the second bar. The first bar, the second bar, the first dam, and the second dam define a first essentially box-shaped region. The first bar weakening section is positioned within the first essentially box-shaped region.

13 Claims, 7 Drawing Sheets

(56) References Cited

U.S. PATENT DOCUMENTS

| | | | | |
|---|---|---|---|---|
| 5,863,000 | A * | 1/1999 | Gingras | B02C 7/12 241/261.2 |
| 6,607,153 | B1 | 8/2003 | Gingras | |
| 8,157,195 | B2 * | 4/2012 | Gingras | D21D 1/306 241/24.29 |
| 9,267,234 | B2 | 2/2016 | Huhtanen et al. | |
| 2007/0210197 | A1 * | 9/2007 | Carpenter | B02C 7/12 241/298 |
| 2008/0296419 | A1 * | 12/2008 | Gingras | D21D 1/306 241/261.3 |
| 2013/0015281 | A1 * | 1/2013 | Gingras | D21D 1/306 241/296 |
| 2017/0167078 | A1 | 6/2017 | Kerblom | |

OTHER PUBLICATIONS

Indian Office Action, Application No. 202017036756, dated Aug. 25, 2021, 5 pages.

* cited by examiner

REFINER SEGMENT HAVING BAR WEAKENING SECTIONS

CROSS-REFERENCE TO RELATED APPLICATIONS

The present application is a U.S. national stage of PCT Application No. PCT/SE2019/050153, filed Feb. 20, 2019, which claims the benefit of, and priority to, Swedish Patent Application No. 1850420-9, filed Apr. 13, 2018.

TECHNICAL FIELD

The proposed technology generally relates to a refiner segment for a refiner of lignocellulosic material. More specifically it relates to a refiner segment provided with bars and dams that enables a controlled evacuation of trapped steam. The proposed technology also relates to a refiner disc provided with such a refiner segment and a refiner comprising such a refiner segment.

BACKGROUND

A typical refiner of e.g., lignocellulosic material comprises two relatively rotating discs between which the material is refined or defibrated. The pair of relatively rotating discs may in particular comprise one rotating disc, referred to as a rotor, and a static disc, referred to as a stator. These discs, or at least one of them, are often provided with segments, referred to as refiner segments, in order to obtain a more efficient refining of the material. Conventional refiner segments are often provided with bars and dams. The bars are protruding structures arranged on the segment that are mainly utilized to provide an efficient refining of the lignocellulosic material. The purpose of the dams are instead primarily to guide, or lift, the material flow towards the disc gap between two refining discs, e.g., the disc gap between a rotor and a stator or the disc gap that separates the two relatively rotating discs. It is in the disc gap between the discs that the material is refined or defibrated.

During normal use of a refiner the refining or defibration action will cause friction which in turn will heat up the processed material. Since lignocellulosic material, e.g., wood pulp, naturally contains water the friction will heat up the water and steam will be created. The created steam may severely affect the material flow. It may interact with material flow and perturb the intended paths for the material flow.

A particular type of refiner segment are provided with bars that often extend in a more or less radial direction with regard to a center of a circular refining disc. A particular refiner segment may thus contain a plurality of radially extending bars. The dams on the other hand may be provided on the refiner segment in such a way that a particular dam contacts two neighboring bars. That is, the dam is provided so that it spans over a direction connecting two adjacent bars. The purpose of the dam is in this case to lift the material flowing in the area between the bars towards the disc gap. In the common case where each bar is provided with several dams, a natural consequence of the geometry is that a number of partially enclosed areas will be created between adjacent bars. These partially enclosed areas defines box shaped regions between adjacent bars.

A particular issue with these box shaped regions is that steam may get caught there. Due to the fact that the steam is trapped in the region the pressure will build up over time, since more and more steam will be trapped. The high pressure steam will constantly bombard the surfaces of the box shaped region until it finally may escape through a created hole in the surface. These holes often tend to form in one of the provided dams. This hole will get larger and larger and larger until it finally forms a channel where steam can evacuate one box shaped region and possibly enter another. The same procedure will be repeated until almost all dams are damaged. The steam channels will also cause a pressure drop which will allow the material flow to evacuate one box shaped region and enter another. The fact that the dams will be damaged by these created steam channels will therefore negatively affect the dams efficiency when it comes to guiding or lifting the material flow towards the refining disc gap.

The proposed technology aims to provide mechanisms that at least alleviates the drawbacks associated with the fact that steam gets trapped in the box shaped regions defined by adjacent bars and dams.

SUMMARY

It is a general object of the proposed technology to provide refiner segments having both improved refining efficiency over time and improved material flow control.

It is a particular object to provide refiner segments that allows steam trapped in certain areas of the refiner segment that are bounded by bars and dams to evacuate the same area a with a reduced risk of damaging any dams.

It is another object of the proposed technology to provide a refiner comprising a refining disc that comprises a refiner segment that allows steam trapped in certain areas of the refiner segment to evacuate the same with a reduced risk of damaging any dams.

These and other objects are met by embodiments of the proposed technology.

According to a first aspect, there is provided a refiner segment adapted to be attached to a refining disc of a refiner of lignocellulosic material, the refiner segment comprising a number N, $N \geq 2$, of bars 10 and a number M, $M \geq 1$, of dams, the bars and dams being arranged in a pattern whereby essentially box shaped regions are created in areas defined by neighbouring bars and at least one dam extending between the neighbouring bars, wherein at least one of the bars that defines such an essentially box shaped region comprises a bar weakening section, arranged within the essentially box shaped region, and provided to enable steam trapped in the essentially box shaped region to escape the essentially box shaped region via the bar weakening section.

A particular version of the first aspect provides a refiner segment adapted to be attached to a refining disc of a refiner of lignocellulosic material. The refiner segment comprising a number N, $N \geq 2$, of bars and a number M, $M \geq 2$, of dams. The bars and dams being arranged in a pattern whereby essentially box shaped regions are created in areas defined by neighboring bars and at least two dams extending between the neighboring bars at different locations along the length direction of the bars, wherein at least one of the bars that defines such an essentially box shaped region comprises a bar weakening section, arranged within the essentially box shaped region, and provided to enable steam trapped in the essentially box shaped region to escape the essentially box shaped region via the bar weakening section.

According to a second aspect there is disclosed a refiner comprising a refining disc provided with a refiner segment according to the first aspect.

Embodiments of the proposed technology provides mechanism for obtaining a more controlled material flow and also reduces the risk of damaging dams. Damaged dams may lead to reduced refining efficiency due to the fact that the material flow, which is to be guided towards the disc gap of the refiner by the dams, may find alternative ways or paths along the refining segment. This may in turn necessitate longer refining processes and higher energy costs.

Since the proposed technology reduces the risk of damaging the dams it also prolongs the usable life time of the refiner segment.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, etc. are to be interpreted openly as referring to at least one instance of the element, apparatus, component, means, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For a better understanding of the proposed technology, it may be useful to begin with a brief overview of the relevant technology and an analysis of the associated technical problem.

Figure 6:
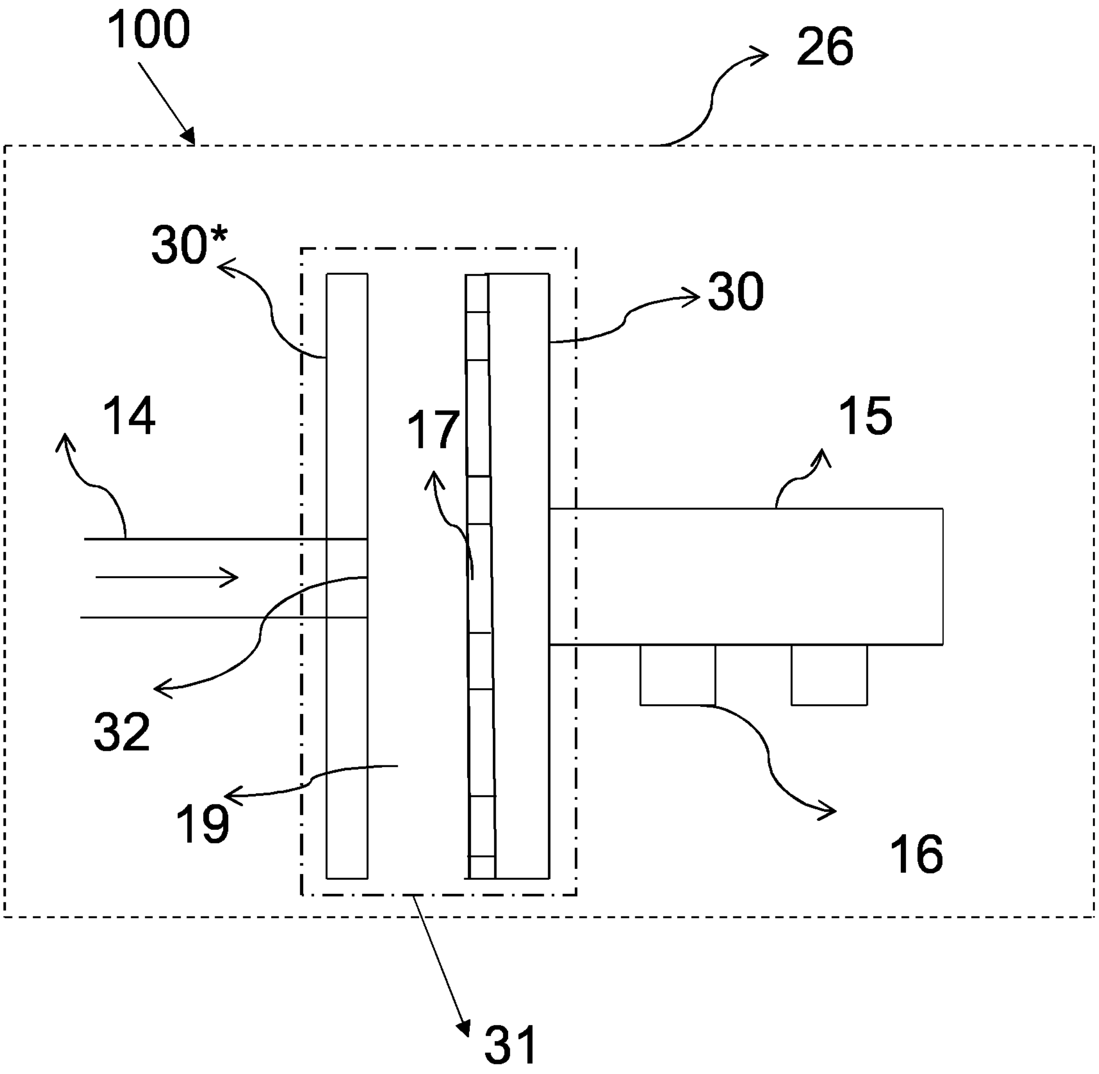
FIG. 6 is a schematic cross-section illustration of a refiner in which the proposed technology can be used.

To this end reference is made to FIG. 6 which schematically illustrates a refiner that can utilize the proposed technology. FIG. 6 schematically shows an exemplary pulp refiner in a cross-sectional view. The arrangement is housed in a housing 26 that represents the outer casing of the refiner device together with all components of the device that is not essential for understanding the present invention. Examples of components not shown are an electrical motor for driving e.g. the rotation shaft, the feeding mechanism for the lignocellulosic material etc. Inside a second housing 31 a rotor refiner disc 30 and a stator refiner disc 30* is linearly aligned along a shaft. The rotor refiner disc 30 and the stator refiner disc 30* will in what follows be referred to as a rotor and stator, respectively. The rotor 30 is attached to a rotation shaft 15 arranged on bearings 16. The rotation shaft 15 is connected to a motor, not shown, that rotates the shaft 15, and thus the rotor 30. The stator 30* facing the rotor 30 can be provided with a centrally located through hole 32 that extends between a feeding channel 14 for lignocellulosic material and a refining area 19. The rotor 30 can in certain embodiments be provided with a center plate 17 having a surface facing the incoming flow of lignocellulosic material. The surface of the center plate 17 can be provided with structures that will direct the lignocellulosic material outwards. The rotor 30* and/or the stator 30 are provided with refiner segments to enable steering and grinding of the pulp. These refiner segments can be provided with bars and dams.

During use, lignocellulosic material such as wood chips or prepared wood, e.g., pulp, will be fed by means of a feeding mechanism, not shown, through the feeding channel 14. The material will pass through the hole 32 in the stator 30* and enter an area 19. The area 19 is essentially defined by the open area between the rotor 30 and the stator 30* and this area can be quite small during operation. The lignocellulosic material flowing into the area 19 will be incident on the center plate 17 on the rotor 30. The center plate 17 acts to steer the lignocellulosic material out towards the refiner segments on the rotor and/stator.

Figure 7:
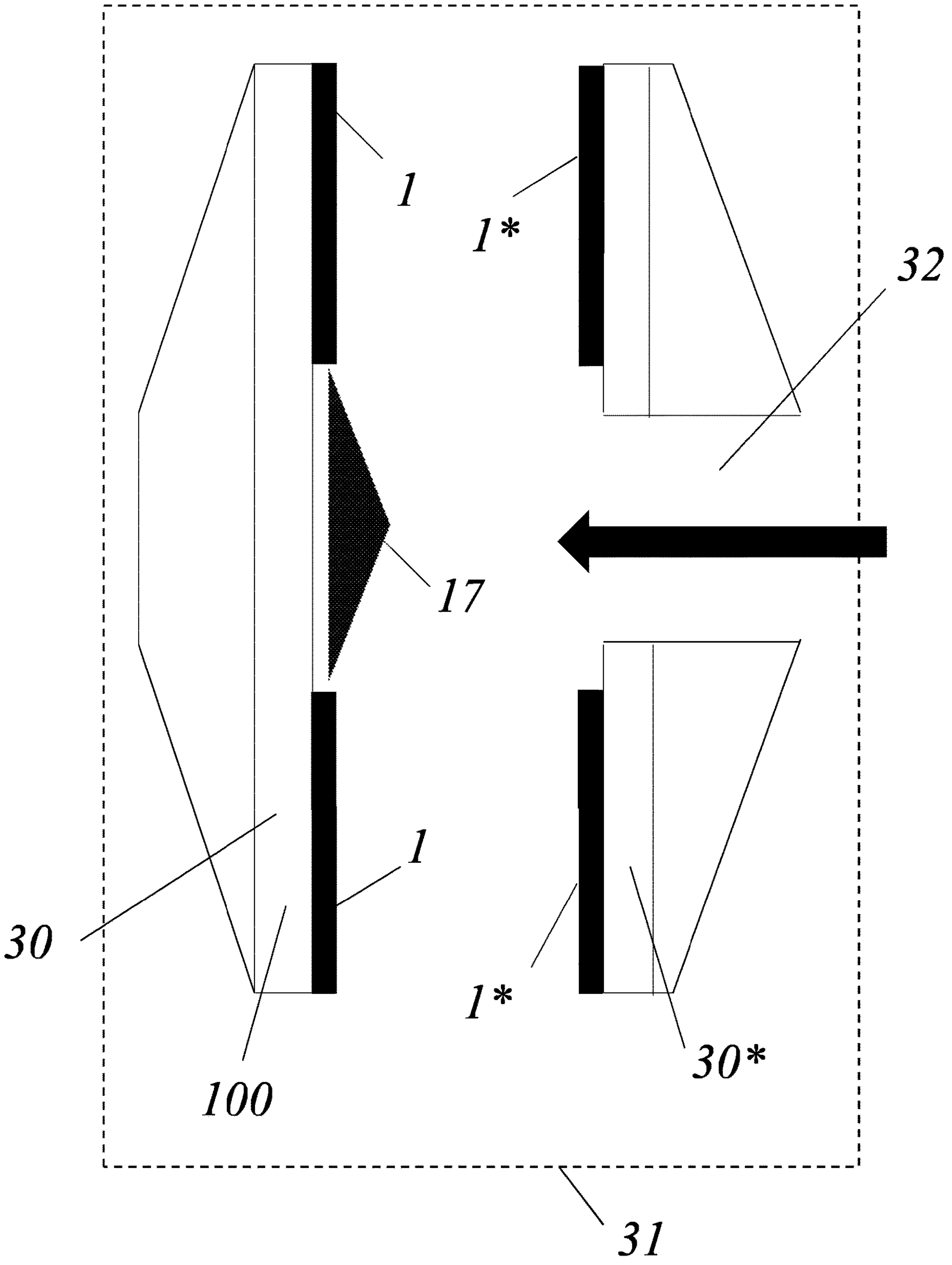
FIG. 7 is a schematic illustration of parts of the refiner illustrated in FIG. 6. The section of the refiner that comprises the relatively rotating refiner discs are shown in cross-section.

In order to provide a more detailed description of a rotor-stator arrangement in which the proposed technology may be used reference is made to FIG. 7. FIG. 7 illustrates a cross-sectional side view of a rotor-stator arrangement housed in a housing 31 in a refiner as e.g., described above. Shown is a rotor that is arranged to rotate around a rotation shaft. The rotor is provided, on the surface facing the stator, with a refining disc 30 comprising a refiner segment 1. The stator is provided, on the surface facing the rotor, with a refining disc 30* comprising a refiner segment 1*. The refining discs may in certain versions of a refiner be referred to as a segment holders since one of the purposes of the refining discs are to carry refiner segments 1, 1*. Also illustrated in FIG. 7 is an inlet 32 for the lignocellulosic material subject to refining. The inlet 32 is arranged in the central area of the stator. Arranged in the center area of the refining disc on the rotor side, opposing the inlet 32, is a center plate 17. The purpose of the center plate 17, which was described above with reference to FIG. 6, is to distribute material that falls in from the inlet 32 towards the outer sections of the refining disc. That is, the center plate 17 acts to distribute the material towards the refiner segments arranged on the refiner discs.

Having described in detail a general refiner that can utilize the proposed technology, we will proceed and describe in detail a particular refiner segment that is relevant for the proposed technology. To this end reference is made to FIG. 1.

Figure 1:
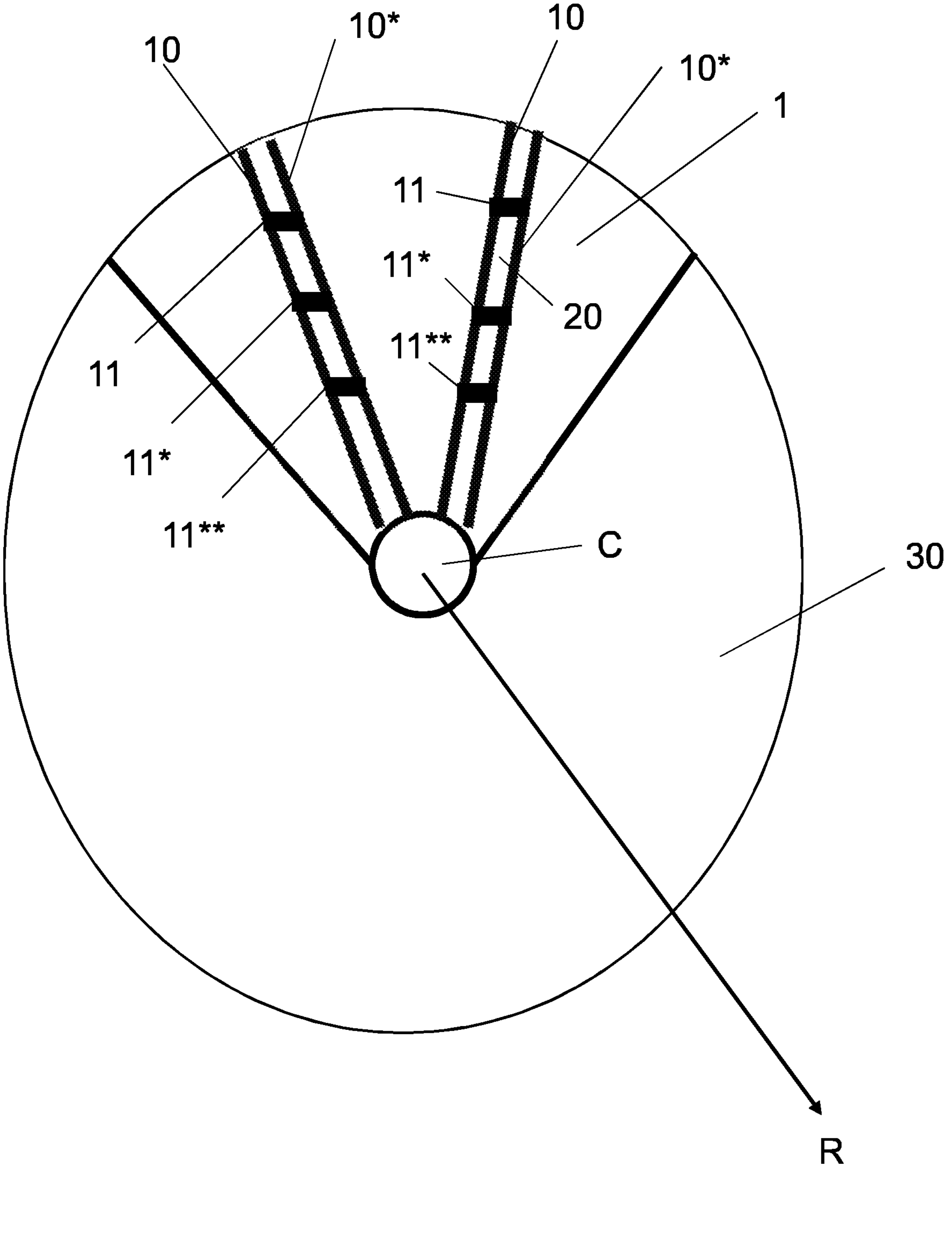
FIG. 1 is a schematic illustration of a refiner disc provided with a refiner segment comprising bars and dams. The pattern of the bars and dams yields partially confined regions.
Figure 2:
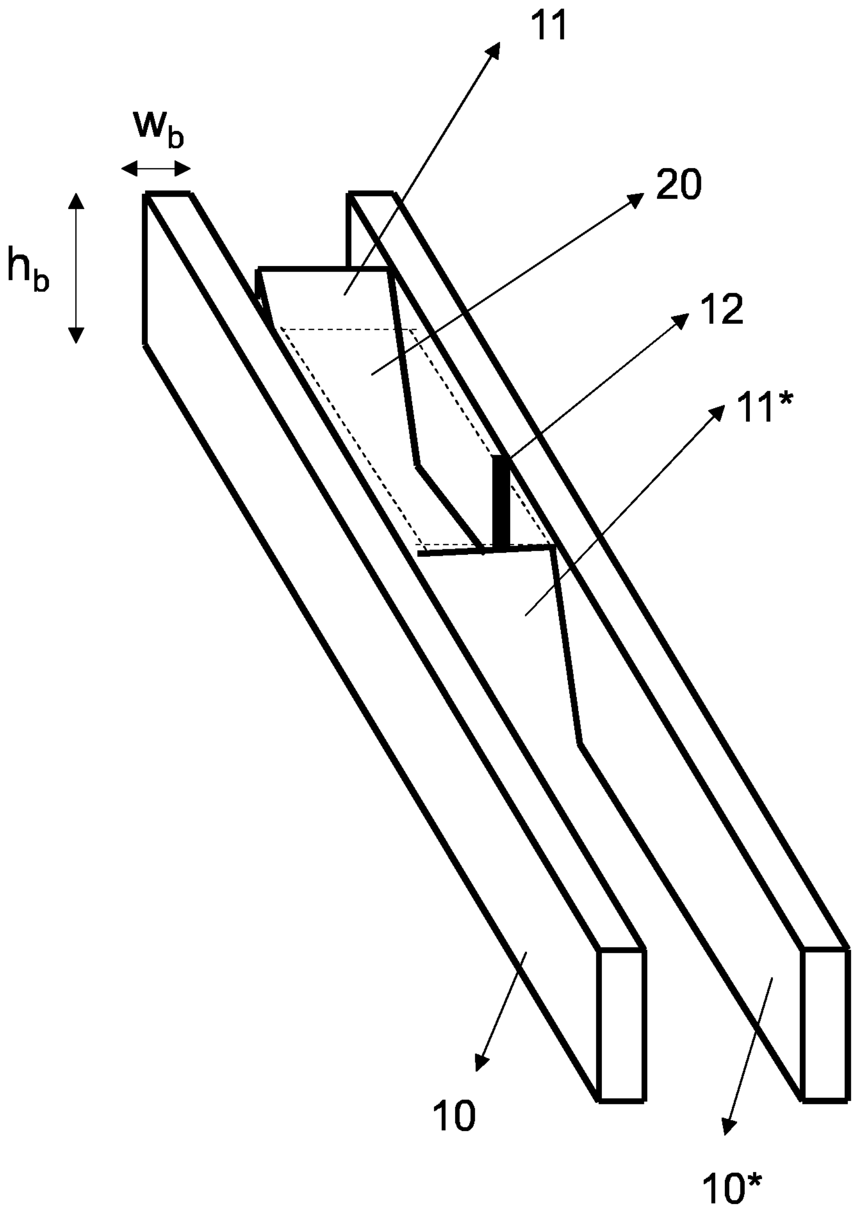
FIG. 2 is a schematic illustration of part of a refiner segment comprising two adjacent bars connected by two dams and a bar weakening section according to the proposed technology.

FIG. 1 provides a schematic illustration of a refiner disc 30 that comprises a refiner segment 1. The refiner segment 1 consists in this particular example of a circular sector. There are other versions of refiner segments, the proposed technology however functions equally well for all particular refiner segment shapes. To avoid cluttering the drawing illustrates two refining bars 10; 10* each being associated with three dams 11; 11*; 11. Each of the dams 11; 11*; 11** extends from a location on the bar 10 to a location on the adjacent or neighboring bar 10*. They are however spatially separated as each dam is located at different positions with regard to a radial direction having its origin in the center C of the refining disc 30. It should be noted that the bars 10; 10* protrudes to a height $h_b$ above the surface of the refiner segment 1, see FIG. 2. The area between adjacent bars therefore defines channels. It should also be noted that the dams 11; 11*; 11** protrudes from the surface of the refiner segment 1 so that their highest section lies essentially flush with the upper side of the bars. This particular geometry creates box shaped partially enclosed regions 20 on the refiner segment 1. Such a partially enclosed region 20 is bounded by opposing sides of the adjacent bars 10; 10* and by e.g., the dams 11 and 11*. The box shaped region 20 is illustrated in greater detail by the dotted line in FIG. 2. FIG. 2. also illustrates a particular geometry where the dams are given a wedge like shape where the highest point on the wedge is at approximately the same height as the upper side of the adjacent bars 10; 10*. The slope of the wedge shaped dam 11 is directed towards the box shaped region 20. Normally a refiner segment 1 comprises a number of bars and dams whereby a large number of box shaped regions 20 will be present. It should be noted that the box shaped regions 20 may be created by means of only two adjacent bars 10; 10* and a single dam 11. Such a region may be created by two bars whose length directions coincides whereby a single dam 11 may be provided at a radial direction different from the position where they coincide in order to create a region 20 in the shape of a triangular box. The proposed technology can also be applied to such a geometry. A refiner segment 1 may in particular be provided with both regions 20 that have a more or less rectangular shape and regions 20** that have a triangular shape.

As was explained earlier, one particular problem associated with refiner segments having these box shaped regions 20 is related to the fact that steam produced during the refining process may get trapped in those regions. Since the regions acts as a steam trap the pressure within them will build up over time and the steam will bombard the surfaces of the box shaped region with increasing frequency until an opening in any of the confining surfaces emerges. Such an opening caused by the impact of high pressure steam will then act as an evacuation or escape channel and grow bigger and bigger the longer the process continues. It is quite common that these steam evacuation channels will be formed in the dams. These channels will lead to a pressure drop over the region whereby material present in one particular region, e.g., a first box shaped region is able to enter an adjacent or neighboring box shaped region. This is an unwanted effect since the geometry of a refiner segment provided with bars and dams is intended to provide a means for directing the material towards the disc gap between the relatively rotating discs, i.e., towards the highest point of the refiner segment with regard to the refining disc.

The proposed technology aims, according to a first aspect, to provide a refiner segment having certain features that enables the steam to evacuate the box shaped regions at locations that are not as critical as the dams.

This object is obtained by means of a refiner segment 1 that is adapted to be attached to a refining disc 30 of a refiner 100 of lignocellulosic material. The refiner segment 1 comprises a number N, N≥2, of bars 10 and a number M, M≥1, of dams 11, the bars 10 and dams 11 being arranged in a pattern whereby essentially box shaped regions 20 are created in areas defined by neighbouring bars 10, 10* and at least one dam 11 extending between the neighbouring bars 10, 10*, wherein at least one of the bars 10, 10* that defines such an essentially box shaped region 20 comprises a bar weakening section 12, arranged within the essentially box shaped region 20, and provided to enable steam trapped in the essentially box shaped region 20 to escape the essentially box shaped region 20 via the bar weakening section 12.

It is in other words provided a refiner segment 1 that provides a mechanism whereby steam trapped in the essentially box shaped region 20 can penetrate or break through the bar weakening section 12 in order to escape the essentially box shaped region 20.

A particular version of the above refiner segment provides a refiner segment 1 that is adapted to be attached to a refining disc 30 of a refiner 100 of lignocellulosic material. The refiner segment 1 comprising a number N, N≥2 of bars 10 and a number M, M≥2, of dams 11. The bars 10 and the dams 11 being arranged in a pattern whereby essentially box shaped regions 20 are created in areas defined by neighboring bars (10, 10*) and at least two dams 11, 11* extending between the neighboring bars 10, 10* at different locations along the length direction of the bars 10, 10*, wherein at least one of the bars 10, 10* that defines such an essentially box shaped region 20 comprises a bar weakening section 12, arranged within the essentially box shaped region 20, and provided to enable steam trapped in the essentially box shaped region to escape said essentially box shaped region 20 via the bar weakening section 12.

FIG. 2 provides an illustration of one particular embodiment of such a refiner segment 1. To achieve some clarity in the drawing it only illustrates a single box shaped region that is confined by adjacent bars 10; 10* and dams 11; 11*. The proposed technology has provided at least one of the bars 10; 10* with a bar weakening section 12 arranged on the side facing the open region. That is, on a side of the bar that is facing, i.e., is directed towards, the box shaped region defined by the surface of the refiner segment where the material flows, and the bars 10, 10* and dams 11; 11*. The bar weakening section 12 aims to provide a particular weak spot or section in the region 20 where it is more likely that any steam will break through and create a steam evacuation channel or steam escape channel. The bar weakening section 12 may be provided in various forms such as a notch or kerf or as holes extending into the bulk of the bar. The bar weakening section should preferable not extend all the way through the bar 10* since such a channel will open up into an adjacent box shaped region 20 and this will lead to a swiftly achieved pressure equilibrium. This is not a wanted feature since the presence of high pressure regions, such as the box shaped regions 20, have shown to be of importance in order to maintain a reasonable disc gap between the relatively rotating refining discs. The high pressure regions acts as a sort of cushion separating the opposing refining disc and allowing material to be grinded in the disc gap. If the high pressure regions were not present the disc gap would get smaller and smaller which would negatively affect the refining action. With very small disc gaps the refining will be mostly due to contact refining which is mostly unwanted. The proposed technology has been developed to ensure that both high pressure regions are present for a sufficiently long time and that the dams are not damaged by trapped steam.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 3:
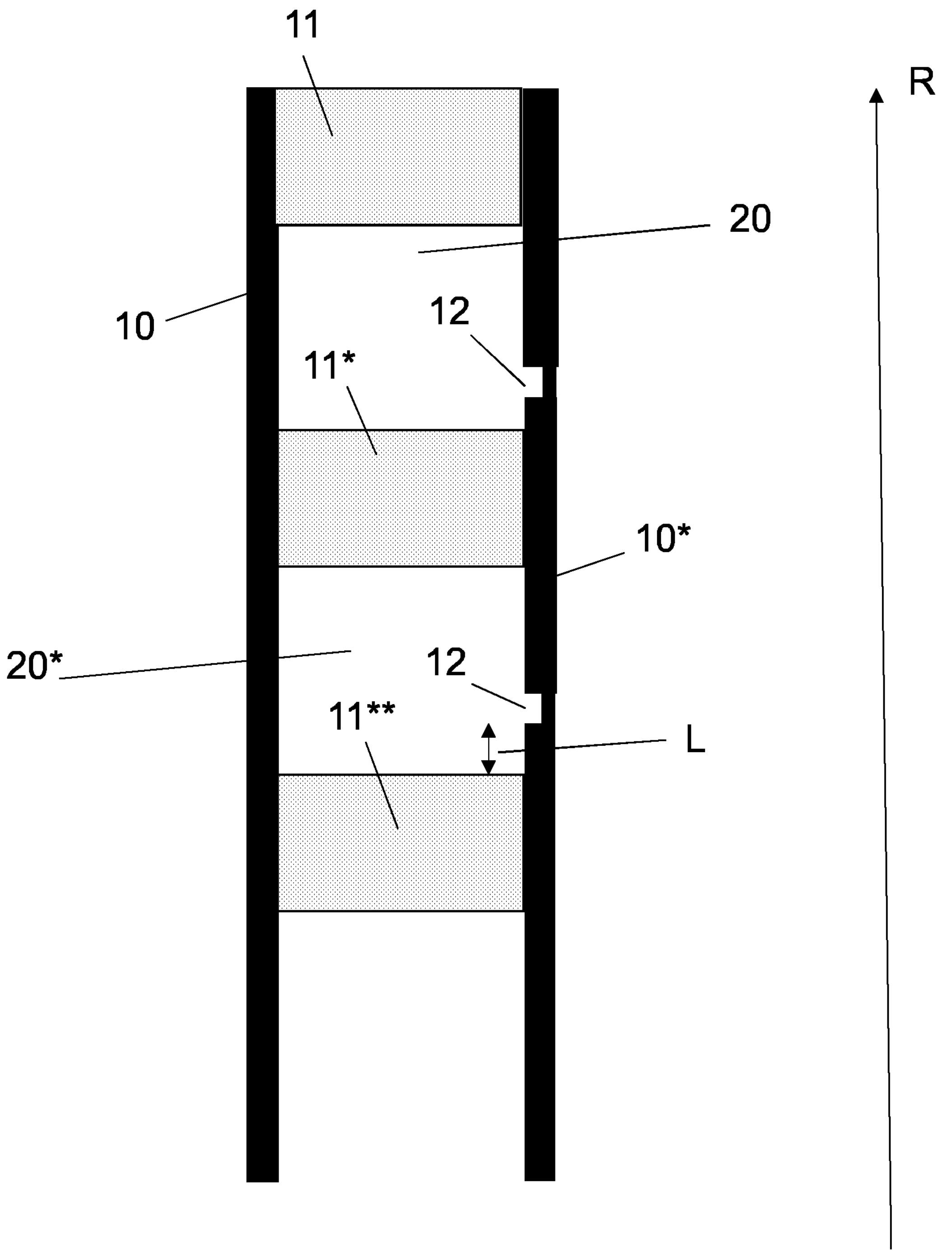
FIG. 3 is a schematic illustration from above of part of a refiner segment comprising two adjacent bars connected by three dams and two bar weakening sections according to the proposed technology.

FIG. 3 provides a schematic illustration of a simple refiner segment 1 comprising two bars 10; 10* and three dams 11; 11* as viewed from above. As a consequence of the geometry two box shaped regions 20; 20* are created, one partially confined by dams 11; 11* and one partially confined by dams 11*; 11. Further illustrated is that the bar weakening section 12 comprises a region on the bar 10* where material from the bar 10* has been removed in order to create a recess. FIG. 3 also illustrates that the bar weakening section 12 is provided on the bar 10, 10* in the vicinity of the dams 11*; 11**. Preferably the bar weakening section for the upper box shaped region 20 should be provided at a distance L from the dam 11*, where L preferably is selected from a distance in the interval $0 \leq L \leq 510$ mm. The same applies to the lower box shaped region 20* where the bar weakening section preferably should be provided at a length L from the dam 11****.

Figure 4A:
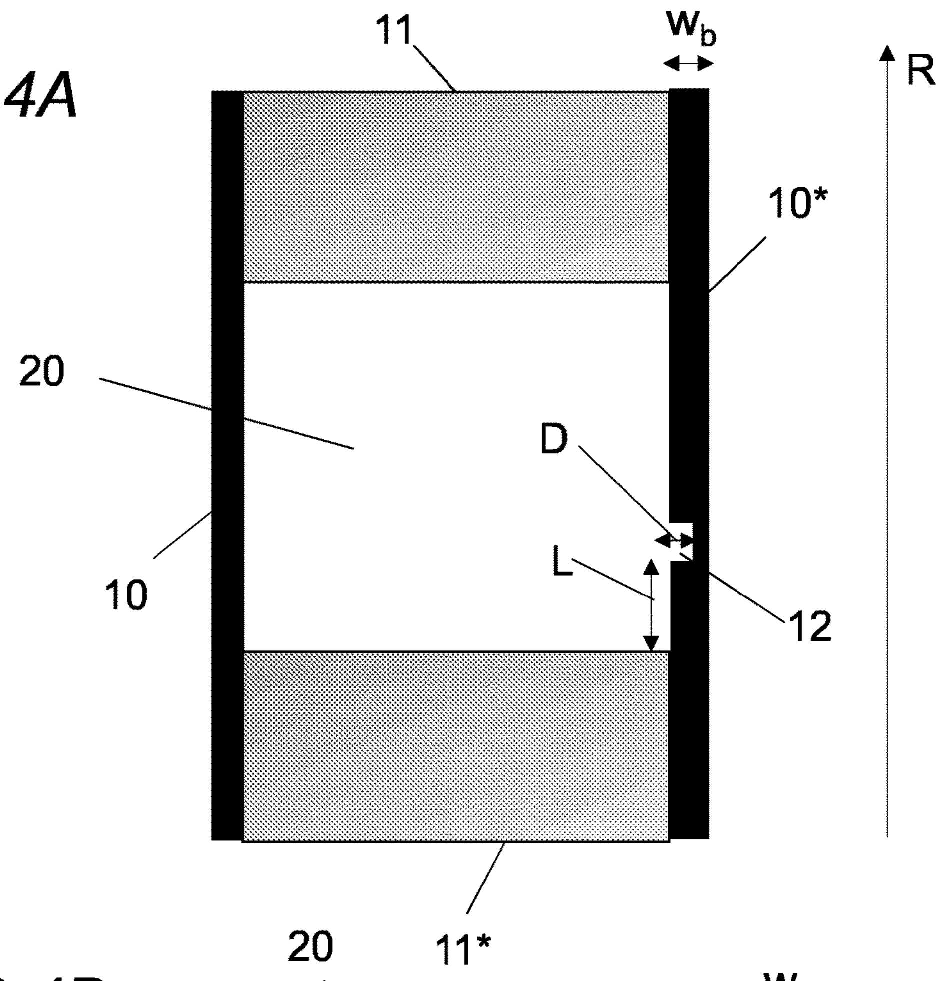
FIG. 4A is a schematic illustration from above of two adjacent bars connected by two dams and a bar weakening section according to the proposed technology.

FIG. 4A provides an illustration of a refiner segment 1 wherein the bar and dam pattern yields at least one essentially box shaped region 20 provided in a region defined by neighbouring bars 10, 10* and two dams 11, 11* extending between the bars 10, 10* at different locations along the length direction of the bars 10, 10*, and wherein the bar weakening section 12 is provided at a distance L from the dam 11; 11* that, during use of the refiner 100, is closest to the centre of the refining disc 30.

In other words, it is illustrated an embodiment where a box shaped region is defined by the opposing sides of adjacent bars 10; 10* and by dams 11; 11* extending between the bars 10; 10* at two different locations along the radial direction of the refiner segment. In the vicinity of the dam 11* that is closest to the centre of the disc equipped with the refiner segment 1 there is provided a bar weakening section 12. The bar weakening section is provided as a recess that extends into the bulk of the bar 10*. The recess may extend a depth D into the bulk where D preferably lies in the interval $w_b/2 \leq D \leq w_b$ where $w_b$ defines the width of the corresponding bar 10,10*.

Figure 4B:
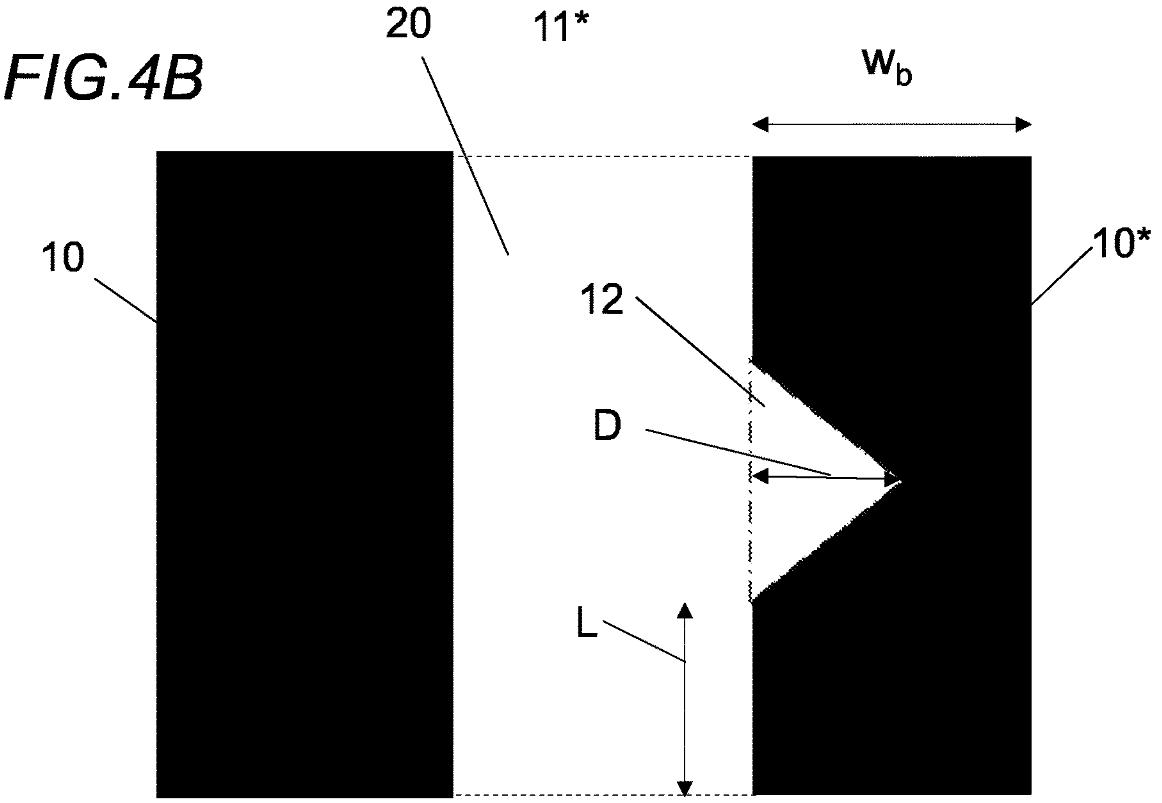
FIG. 4B is a schematic illustration of part of the refiner segment in FIG. 4A in greater detail.

FIG. 4B provides an alternative version of the bar weakening section 12 illustrated in FIG. 4A. In FIG. 4B there is illustrated part of a refiner segment 1 wherein the recess provided in the box shaped region 20 has a wedge shaped form where the tip of the wedge is arranged at a depth D that is provided deeper into the bulk of the bar 10, 10* than the base of the wedge. The depth D preferably lies in the interval $w_b/2 \leq D \leq w_b$ where $w_b$ defines the width of the corresponding bar 10,10*.

According to yet another embodiment of the proposed technology there is provided a refiner segment 1 wherein the height H of the recess provided in the box shaped region 20 lies in the interval $h_b/2 \leq H \leq h_b$ where $h_b$ defines the height of the corresponding bar 10,10*. Such an embodiment is schematically illustrated in FIG. 5B.

A particular version of this embodiment provides a recess having the same height as the bar 10; 10*, i.e., a recess that extends from the surface of refiner segment up to the same height over the refiner segment as the bar. Another version may have a recess of height $h_b \leq H$ whose lower end is provided at some particular height over the surface of the refiner segment 1. The upper end of the recess may terminate at the upper surface of the bar 10; 10*. The upper end of the recess may also terminate at some height that is lower than the height $h_b$ of the bar. That is, the recess may be a kerf like structure provided on the side of the bar facing the box shaped region 20.

Figure 5A:
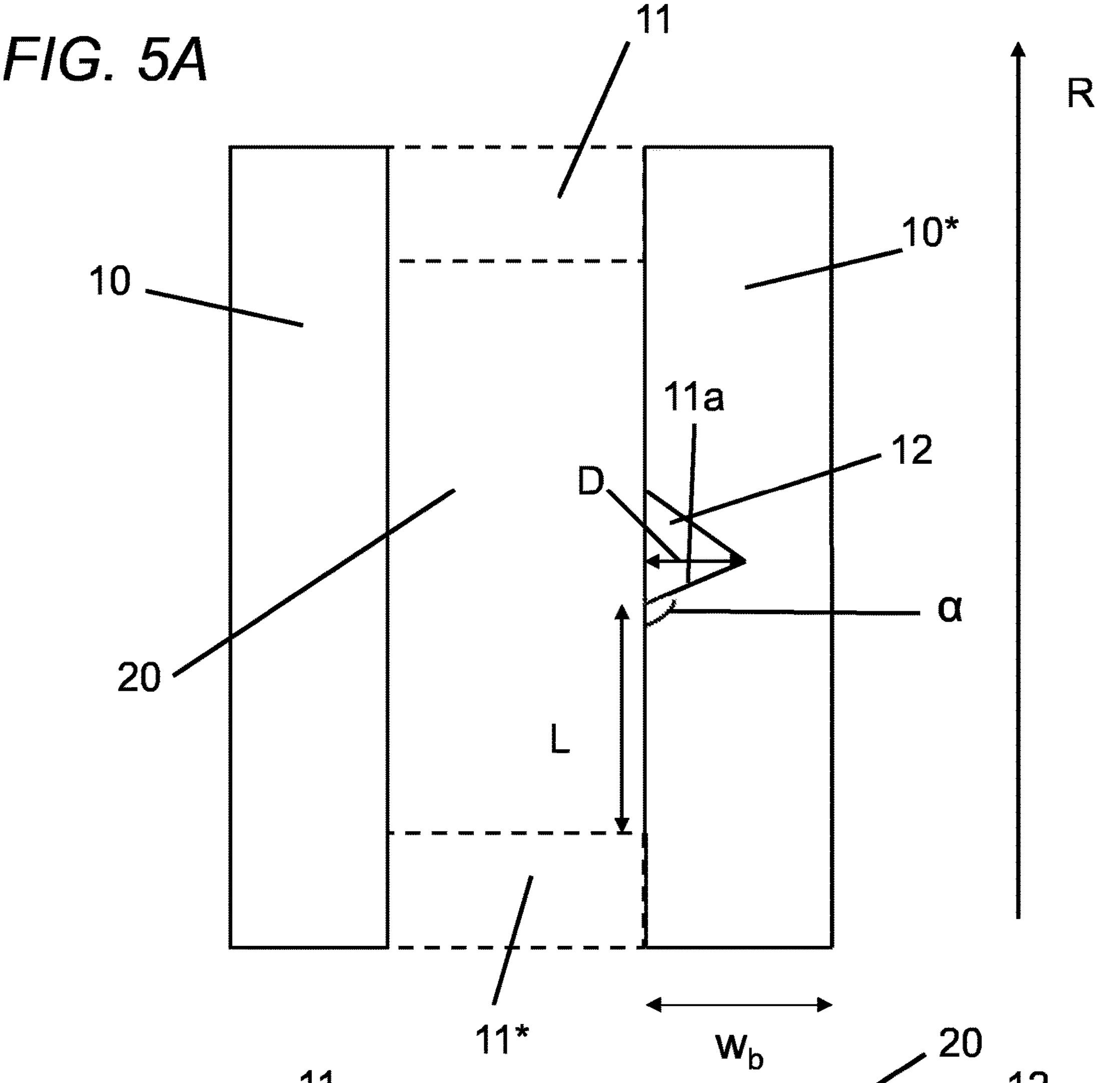
FIG. 5A is a schematic illustration of an alternative embodiment of the part of the refiner segment that was illustrated in FIG. 4A.

Still another embodiment of the proposed technology provides a refiner segment 1 wherein the recess is provided in the bar 10, 10* in such a way that an angle α is formed between the length direction R of the bar 10, 10* and one end 11*a* of the recess. It is preferable that the angle α lies in the interval $5° \leq \alpha \leq 135°$. FIG. 5A provides an illustration of a box shaped region 20 in such an embodiment. FIG. 5A illustrates how a region 20 is confined between two adjacent bars 10; 10* and two dams 11; 11* provided at different radial positions. The bar 10* is in this example provided with a bar weakening section 12 in the form of a wedge shaped recess that is provided at a distance L from the dam 11* that is closest to the centre of the refining disc during use. The tip of the wedge is provided at a depth D in the bulk of the bar 10*. The wedge is provide on the side of the bar 10* that faces the box shaped region 20. It is moreover provided in such a way that an angle α is created between the surface 11*a* of the wedge, i.e., the side of the wedge that is closest the centre of the refining disc during use, and the length direction of the bar 10*. In a polar coordinate system the length direction may coincide with the radial direction R. It is however also possible that the length direction of the bar is angled relative the radial direction R.

Figure 5B:
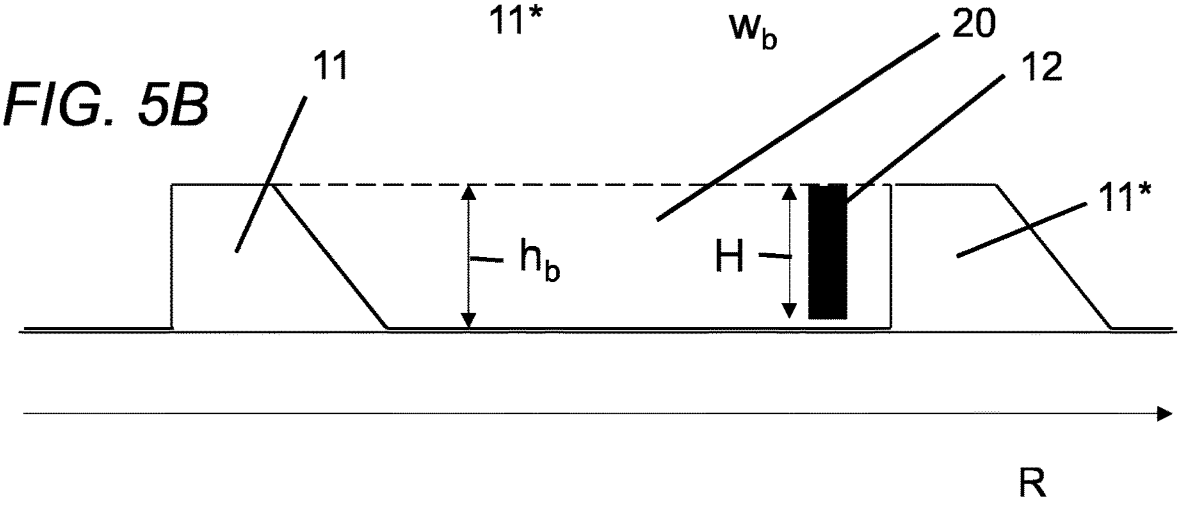
FIG. 5B is a schematic illustration of an embodiment of the proposed technology taken along a section line that is parallel with the radial direction of the refiner disc.

FIG. 5B provides a schematic illustration of any of the earlier described embodiments as viewed from a section line that is parallel with the radial direction. It is illustrated how a pair of dams 11, 11* partly defines a box shaped region 20 and how a bar weakening section 12 is provided on one of the bars close to the dam 11*. The height H of bar weakening section extends from a height above the surface of the refining segment up to the full height $h_b$ of the bar. So the recess has a height that is slightly smaller than the full height of the bar.

It should be noted that the proposed technology may be utilized on both the rotor side of a refiner and on the stator side. The proposed technology may be provided in the form of a refining segment 1 that can be attached a refining disc 30 that in turn can be attached to the rotor or stator. The refining disc 30 may in this particular case be referred to as a segment holder, see FIG. 7 for an illustration. The refining segment may however also be provided in the form of complete integrated disc, thus forming part of, or defining, the refining disc in itself. In this case the refining segment 1 and the refining disc 30 form an integrated structure that can be attached to a rotor or a stator.

According to a particular embodiment of the proposed technology there is thus provided a refiner segment 1 that is adapted to be attached to a refining disc. The refining disc may either be a rotor refining disc or a stator refining disc, also referred to as rotor disc or stator disc, respectively.

According to an alternative embodiment of the proposed technology there is provided a refiner segment 1 that is integrated with the refiner disc 30. That is, the refining segment 1 can be provided in the shape of a refiner disc that can be either a rotor refiner disc or a stator refiner disc.

The refining segment 1 according to the proposed technology may also be provided in the shape of a segment to be attached to a refiner disc 30. A refining segment may be provided in the shape of a circle, optionally with a removed central area, or in the shape of a circle sector. A refiner disc 30 may thus be provided with a number of refiner segments 1 whereby it will either be completely covered by refining segments 1 or partially covered. The refining segment may in particular form part of a rotor disc or equivalently a rotor refiner disc. In case the refiner segment 1 form part of a rotor refiner disc the center area of the rotor refiner disc 30 may comprise a center plate 17. By way of example, the refiner segment 1 according to the proposed technology may be provided in the form of a circular sector adapted to be attached to a refining disc of a refiner 100.

According to a particular embodiment the refiner segment 1 according to the proposed technology will comprise bars 10 and dams 11 in a region extending from a given radial position R to the periphery of the circular sector, i.e., it can be provided as a band on the outer part of the refiner disc.

An embodiment of the proposed technology provides a refiner 100 comprising a refining disc 30 provided with a refiner segment according to any of the earlier described embodiments.

Generally, all terms used herein are to be interpreted according to their ordinary meaning in the relevant technical field, unless a different meaning is clearly given and/or is implied from the context in which it is used. All references to a/an/the element, apparatus, component, means, etc. are to be interpreted openly as referring to at least one instance of the element, apparatus, component, means, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A refiner segment for a refiner of lignocellulosic material, the refiner segment comprising:
- a first bar having a width w and comprising a first bar weakening section, the first bar weakening section comprising two planar faces defining a wedge-shaped recess with a tip and a base, the two planar faces meeting at the tip, the tip being separated from the base by a depth d, where $0.5w \leq d \leq w$;
- a second bar;
- a first dam extending between the first bar and the second bar; and
- a second dam extending between the first bar and the second bar; wherein:
- the first bar, the second bar, the first dam, and the second dam define a first box-shaped region;
- the first bar weakening section is positioned within the first box-shaped region; and
- the first bar weakening section is the only bar weakening section positioned within the first box-shaped region.

2. The refiner segment of claim 1, further comprising a third dam extending between the first bar and the second bar, the third dam cooperating with the first bar, the second bar, and the second dam to define a second box-shaped region, the third dam comprising a second bar weakening section that is positioned within the second box-shaped region.

3. The refiner segment of claim 1, further comprising:
- a third bar comprising a second bar weakening section;
- a fourth bar;
- a third dam extending between the third bar and the fourth bar; and
- a fourth dam extending between the third bar and the fourth bar; wherein:
- the third bar, the fourth bar, the third dam, and the fourth dam define a second box-shaped region; and
- the second bar weakening section is positioned within the second box-shaped region.

4. The refiner segment of claim 1, wherein:
- the wedge-shaped recess has a first height hr;
- the first bar has a second height hb; and
- $0.5hb \leq hr \leq hb$.

5. The refiner segment of claim 1, wherein the first bar weakening section is provided in a vicinity of the first dam.

6. The refiner segment of claim 1, wherein:
- the first dam is closer to a center of the refiner segment than the second dam; and
- the first bar weakening section is separated from the first dam by a distance of less than or equal to 10 millimeters along a length direction of the first bar.

7. The refiner segment of claim 1, wherein the first bar weakening section comprises a region on the first bar where material from the first bar has been removed in order to create a recess.

8. The refiner segment of claim 7, wherein:
- the recess is provided in the first bar in such a way that an angle $\alpha$ is formed between a length direction R of the first bar and one end of the recess; and
- the angle $\alpha$ lies in the interval $5° \leq \alpha \leq 135°$.

9. The refiner segment of claim 1, wherein the refiner segment is provided in the form of a circular sector.

10. The refiner segment of claim 9, wherein the first bar and the second bar extend to a periphery of the circular sector.

11. A refiner comprising the refiner segment of claim 1.

12. The refiner of claim 11, further comprising:
- a rotor disc; and
- a stator disc;
- wherein the refiner segment is attached to the stator disc.

13. The refiner of claim 11, further comprising:
- a rotor disc; and
- a stator disc;
- wherein the refiner segment is attached to the rotor disc.

* * * * *